United States Patent Office 3,442,817
Patented May 6, 1969

3,442,817
PREPARATION OF ZIRCONIA AND HAFNIA SOLS
Donald V. Luebke, Wilmington, Del., assignor to E. I. du Pont de Nemours and Company, Wilmington, Del., a corporation of Delaware
No Drawing. Filed Apr. 15, 1966, Ser. No. 542,732
Int. Cl. B01j 13/00
U.S. Cl. 252—313                    12 Claims

ABSTRACT OF THE DISCLOSURE

Zirconia sols and hafnia sols are prepared by heating an aqueous solution of zirconyl acetate or hafnyl acetate to a temperature of 175° to 400° C. to form colloidal particles and contacting the resulting suspension with a cation exchange resin to remove free zirconyl or hafnyl ions and thereby effect peptization of the colloidal particles.

---

This invention relates to methods of preparing stable zirconia and hafnia sols. More particularly, this invention relates to the preparation of such sols by hydrolyzing a basic zirconium or hafnium acetate solution.

U.S. Patent Alexander et al. 2,984,628 discloses a process of preparing such sols by autoclaving an aqueous solution of a basic zirconium or hafnium salt in which the anion corresponds to a strong acid and is monobasic. Subsequently, the hydrogen ion content of the hydrolysis product is lowered by suitable methods until it has a pH in the range of 2 to 6. However, the salts used in this process, e.g., zirconium oxychloride, zirconium oxynitrate, are corrosive and it is desirable to develop a process that is less corrosive and is practical for large-scale production. Further the Alexander et al. process requires difficult steps to remove the excess acid present, e.g., filtration, washing and reslurrying; or dialysis or ion exchange.

I have discovered, surprisingly, that stable, concentrated zirconia or hafnia sols can be obtained by the hydrolysis of an aqueous solution of dibasic salts, in which the anion corresponds to a weak acid to form material which can be peptized to form the sol. This process does not use highly corrosive salts nor does it require difficult acid removal steps.

According to my discovery there is provided a novel process for preparing stable, concentrated zirconia or hafnia sols comprising hydrolyzing an aqueous solution of basic zirconyl acetate or hafnyl acetate at high temperatures and pressures to form colloidal particles in the aqueous medium, deionizing the solution containing the colloidal particles by bringing said solution into contact with a cationic exchange resin to remove unreacted, free zirconyl ions ($ZrO^{++}$) or hafnyl ions. Subsequently, the solids content of the deionized solution may be concentrated by evaporation or similar means.

In a further aspect of the invention, the sol produced can be heated to drive off the aqueous medium, thereby producing a dry powder of colloidal size particles. These colloidal particles can be readily dispersed in an organic or aqueous medium.

It is well known in the art that hafnium is extraordinarily like zirconium in chemical behavior. In fact most zirconium in commercial use contains 0.5 to 2.0 parts of hafnium per 100 parts of the combined materials. Therefore, the following disclosure, although only mentioning the zirconium specifically, is generally applicable to the corresponding hafnium compounds.

Starting materials

Zirconyl acetate, also known as basic zirconium acetate or zirconyl diacetate, is commercially available as a dry powder or in aqueous solutions. Processes for making the compound are well known in the art. One of the better known processes involves the neutralization of an aqueous zirconyl chloride solution with sodium carbonate to produce an insoluble cake of carbonated hydrous zirconia, which is subsequently dissolved in glacial acetic acid to yield the desired product. Since it is preferred to effect the process of the invention with as few impurities as possible, relatively pure zirconyl acetate should be used.

Zirconyl acetate is a basic salt of indefinite composition, and contains complex anions. The compound is generally given the formula, $ZrO(C_2H_3O_2)_2 \cdot X H_2O$.

In aqueous solutions, the compound probably exists as polymers of unknown lengths, containing very little free acetic acid.

The $C_2H_3O_2$/zirconium mole ratio of the starting material is a variable that should be considered in the preparation of a sol under a given set of hydrolysis conditions. Thus, the basicity of the basic zirconyl acetate used can vary, the mole ratio of anion/zirconium can vary from 1.1:1 to 4:1. More specifically, it is preferred to use mole ratios between 1.5:1 to 3.5:1. The degree of hydration of the basic zirconyl acetate can also vary widely.

Reaction conditions

The hydrolysis can take place in any suitable reaction vessel. Since the reaction is performed under high temperatures and pressures, an autoclave will generally be used. However, the reaction can take place in other means such as a continuous pipe line reactor and the like. It is desirable that the reaction vessel used have suitable means to provide agitation or turbulence during the reaction.

In operation, an aqueous solution of the basic zirconyl acetate is charged into the autoclave. The concentration of the zirconyl acetate in the solution is normally in the range of 8 to 26% equivalent $ZrO_2$ preferably in the range of 10 to 20%. However, the concentration can be varied through a wider range depending upon the other conditions of operation.

The solution within the autoclave is then heated with steam to a temperature of 175° C. or higher. The temperature at which the hydrolysis is conducted is important in that if it is not high enough, the colloidal particles will not be formed. The temperature should range from about 175° C. to 400° C. and the preferred range being from 180° C. to 225° C. If temperatures below the preferred range, e.g., 120° to 150° C., are used, a hydrolysate containing a gelatinous residue of zirconia will be formed, rather than the desired hydrous zirconia in colloidal form.

The pressure maintained in the reaction vessel is the autogeneous pressure, i.e. the vapor pressure of water at the temperature involved.

The time of the hydrolysis is mainly dependent upon the temperature used and the concentration of the zirconyl ions. The heat is normally applied until the hydolysis is substantially complete. Generally the time involved is in the range of 1 to 3 hours. However, longer or shorter times are possible.

The hydrolysis product is a white slurry which precipitates dense, crystalline particles rapidly. The pH of the slurry is on the order of pH 3.5.

Little is known about the hydrolysis mechanism. It is known that the necessity of performing hydrolysis within the temperature range set forth above is due to the polymeric nature of the zirconyl acetate. At the high temperatures, between 175° C. and 400° C. depolymerization occurs and probably allows the zirconium and oxygen to bond in such a way as to form the monoclinic (Baddeleyite) crystal lattice product. At low temperatures, depolymerization does not occur and chain like molecules become entangled to form skeletons of amorphous material. It is known that acetic acid is not set free in the hydrolysis reaction.

The hydrolysis can be performed batchwise or by using suitable feeding and removal means, on a continuous basis.

The slurry containing the precipitated crystalline particles can readily be peptized to form the stable sol. The peptization is accomplished by deionizing the hydrolysis product with a cation exchange resin to remove traces of unreacted $ZrO^{++}$ ions which act as coagulating agents that cement the ultimate colloidal particles. This deionization with a cation exchange resin produces a product stable at room temperature, a stable colloidal solution.

It is not necessary to contact the hydrolysis product with an anion exchange resin, as acetic acid is not set free during the hydrolysis. After the deionization step, the sol product will contain free acetic acid. The deionization step releases the acid. This acid can be removed by an anion exchange resin or other suitable means, if desired. However, it is not necessary and may not be desirable since the acid helps to stabilize the sol.

The deionization can be conducted batchwise or in an exchange column. In the batchwise embodiment, the slurry is mixed with a cation exchange resin, with the deionization being monitored by the changing pH. The resin requirement can be determined by progressively adding weighed amounts of resin to a weighed amount of slurry until the equilibrium pH is obtained and peptization takes place. Then the resin can be screened out or removed by other suitable means. During the deionization, peptization takes place. The white slurry from the hydrolysis reaction is changed so that it now takes on a bluish cast. This is an indication that it is now a sol.

Larger scale operations can be conducted in a downflow column containing the cation exchange resin. In this embodiment, the resin in the column can be reused by washing and regeneration with dilute sulfuric acid.

The resin used in the exchange column or in the batchwise embodiment can be any strong acid cationic exchange resin. Suitable cation resins which can be used are Fisher's Certified Reagent, Rexyn RG 50 or Rohm & Haas Amberlite IR–120. These resins are strong acid, polystyrene sulfonic acid types in hydrogen form. These resins have a mesh size of 16 to 50, a moisture content of 49%, and an active working density (dry) of 0.52 gram per cc. Another useful resin is Dowex 50W, an aromatic hydrocarbon polymer containing nuclear sulfonic groups. Other useful cationic exchange resins are of the type described in U.S. Patent 2,366,007.

After the deionization by the cationic exchange resin, the peptized, dilute sol can be concentrated by various means. Thus the sol can be heated under vacuum and agitation to remove moisture and some of the acetic acid released during the peptization process. If hydrolysis is carried out with a zirconyl acetate solution containing the equivalent of 10% $ZrO_2$, it is necessary to remove as overhead an acetic acid-water mixture which is approximately ⅔ of the original volume of the sol to obtain a product containing approximately 25% $ZrO_2$.

The concentration can also be accomplished under atmospheric conditions, i.e., by atmospheric evaporation, and a vacuum need not be used. With the sol produced by the process of the invention, it is possible to concentrate the $ZrO_2$ as high as 40%. It is obvious that if the starting sol has a high concentration of $ZrO_2$, it may not be necessary to concentrate.

It is also possible to produce dry redispersible zirconia powders from the sol produced by the process of the invention. These ultimate particles are of colloidal size and are dense, discrete entities of crystalline material which form porous aggregates. The zirconia powders are produced by drying the sol on a steam heated hot plate, a drum drier or other suitable means such as by azeotropic distillation with n-propanol. The powders produced are redispersible in water or in various organic solvents.

In a related aspect, part of the water in the original sol can be replaced by suitable organic solvents, e.g., glycol, n-propanol, etc. to form organosols.

Product characterizations

The sols and dry dispersible powders produced by the process of the invention are similar to those produced by the process of Alexander et al. U.S. Patent 2,984,628 and can be characterized by the same technique as set forth in col. 4 of that patent. However, in view of the different process steps, there are some differences in the final product. In view of the fact that particle size is dependent upon temperature and the time of hydrolysis, there will be a difference in the ultimate particle size since the process of this invention is conducted at higher temperature.

In general, the ultimate particle produced by the process of this invention will be larger. Thus the specific surface area of the particles produced by the process of this invention will generally be in the range of 20 to 200 $m.^2/gm.$ as measured by nitrogen adsorption. The specific surface area of these dry powders can be measured by the method set forth in column 4 of Alexander et al. U.S. Patent 2,984,628.

The sols produced by the process of this invention generally will contain from 5 to 15% acetic acid. This is due to the fact that the sol is not anion deionized or dialyzed, nor is the acid removed by mechanical means such as filtration or centrifugation. This acetic acid will act as a stabilizer. The acetic acid can be removed by an anion exchange resin, but this removal is not necessary and in fact, it is usually not desirable. As a result of the presence of the acetic acid, the sol produced by the subject process would ordinarily have a pH in the range of 2.5 to 2.8.

Uses of the product

The sols or the dry dispersible powders of the invention have a wide variety of uses. The Alexander et al. patent discloses many uses for the zirconia and hafnia sols and the sols produced by the present invention can be similarly used. In addition, since traces of strong acid are absent from the products of the invention, they have application in the field of cosmetics and deodorants.

In order that the invention can be better understood reference should be had to the following examples:

Example 1

An aqueous solution of zirconyl acetate, containing the equivalent of 10% $ZrO_2$, with an acetate/zirconium ratio of 1.78 is sealed in polymer tubes in autoclave and heated at 200° C. for three hours. The autoclave is then cooled with water to a temperature of 50° C. and the tubes containing the hydrolysis product are unloaded.

The hydrolysis product is then contacted with the cationic exchange resin, Rohm & Haas Amberlite IR–120 (a strong acid, polystyrene-sulfonic acid type in hydrogen form). The pH of the hydrolysis reaction is lowered from 3.5 to 2.6 (equilibrium). The cation exchange resin is then screened out and the resulting product is a dilute stable zirconium sol.

The dilute sol is then concentrated by heating it to 66° C. at constant volume under 55 cm. Hg vacuum with agitation. The heating is continued until a concentration of 25% $ZrO_2$ is obtained. The product obtained was a stable, colloidal sol containing 25% $ZrO_2$.

The sol is then dried on a steam hot plate until a powder is obtained. The nitrogen surface area of the colloidal particles is determined to be 107 $m.^2/gm.$ An X-ray diffraction pattern of the particles produced indicated that the particles are monoclinic crystals (Baddeleyite). This dry powder is redispersible in water.

Example 2

An aqueous solution of zirconyl acetate containing an equivalent of 22% $ZrO_2$ is heated in an autoclave at 200° C. for three hours. The product of the hydrolysis is a white slurry which settles rapidly.

The slurry is then run through a downflow column containing a cationic exchange resin, Rohm & Haas Amberlite IR–120 (a strong acid, polystyrene-sulfonic acid type in hydrogen form). After running through the column the hydrolysis product is peptized and has an equilibrium pH of 2.65. The dilute sol is then concentrated under atmospheric pressure at 101° C. to yield a stable sol containing 24% $ZrO_2$ and 9.7% acetic acid. This solution is further concentrated in the same manner to a concentration of 40% $ZrO_2$.

The colloidal particles produced are monoclinic crystals and have a specific surface area of 61 m.$^2$/g.

Example 3

An aqueous solution of zirconyl acetate containing the equivalent of 8% $ZrO_2$ with an acetate to zirconium ratio of 1.2 is heated in an autoclave at 250° C. for three hours. The autoclave is cooled and a white slurry is discharged. This slurry is then passed downflow through a column of Amberlite IR–120 in hydrogen form. Effluent from the ion exchange column exhibits opalescence which indicates complete peptization. The pH of the sol is 2.75.

The dilute sol is concentrated at atmospheric pressure and at constant volume by the continuous addition of dilute sol to a heel of concentrated sol in the evaporation vessel as an acetic acid-water mixture is taken overhead. Final concentration of the concentrated product is 12% $ZrO_2$. The percent solids, S, is the dispersed phase determined as set forth in U.S. Patent 2,984,628 is 47. The specific surface area as calculated from electron microscope measurements is 54 m.$^2$/g. The product is stable on storage at 60° C. for longer than 5 months.

Example 4

An aqueous solution of zirconyl acetate containing the equivalent of 10% $ZrO_2$ and an acetate/zirconium ratio of 1.78 is treated with glacial acetic acid to increase the acetate zirconium ratio to 3.5. This solution is heated at 175° C. for 1½ hours in an autoclave. The hydrolysis product is discharged from the autoclave and diverted downflow to a column of Amberlite IR–120.

The dilute sol is concentrated in the manner described in the preceding example to a final concentration of 20% $ZrO_2$. The pH of the final product is 2.5. When diluted to 0.25% solids ($ZrO_2$) the product has a percent transmission of 55 as measured on a Beckman Model DU Spectrophotometer at a wavelength of 400 m$\mu$.

Example 5

To fifty parts by weight of the zirconia sol prepared according to Example 1, which contains 25% solids, there is added 200 parts of n-propanol. This mixture is fed into a heel of 50 parts by weight of n-propanol which is in the distilling pot, the pot being connected to a vigreuex column. Water is removed by azeotropic distillation as rapidly as it was added with the zirconia aqua-organosol.

The resulting product is an anhydrous zirconia propanol sol containing about 18% solids and 8.4% acetic acid. Approximately 0.5% ester is also present as a result of the reaction between acetic acid and n-propanol. A small portion of this sol is air dried to form a dry powder. The surface area of this powder is 143 m.$^2$/g. as measured by nitrogen adsorption, and it is redispersible in water.

I claim:

1. A process for preparing a zirconia sol or hafnia sol comprising heating an aqueous solution of a salt selected from zirconyl acetate and hafnyl acetate to a temperature of from 175° C. to 400° C. to form colloidal particles in the aqueous medium and contacting the aqueous medium containing said colloidal particles with a cation exchange resin to remove free zirconyl or hafnyl ions and thereby effect peptization of said colloidal particles.

2. The process of claim 1 wherein said salt is zirconyl acetate.

3. The process of claim 1 with the additional step of concentrating the solids content of the product sol.

4. The process of claim 1 with the additional step of separating the colloidal particles from the product sol to obtain a dry, redispersible powder.

5. The process of claim 1 wherein said temperature is from 180° to 225° C.

6. The process of claim 1 wherein said salt is present in said solution at a concentration of from 8 to 26% equivalent $ZrO_2$ and wherein said salt has a mole ratio of anion to zirconium or hafnium of from 1.1:1 to 4:1.

7. The process of claim 6 wherein said salt is zirconyl acetate.

8. The process of claim 6 wherein said temperature is from 180° to 225° C.

9. The process of claim 8 wherein said salt is zirconyl acetate.

10. The process of claim 1 wherein said salt is present in said solution at a concentration of from 10 to 20% equivalent $ZrO_2$ and wherein said salt has a mole ratio of anion to zirconium or hafnium of from 1.5:1 to 3.5:1.

11. The process of claim 10 wherein said temperature is from 180° to 225° C.

12. The process of claim 11 wherein said salt is zirconyl acetate.

References Cited

UNITED STATES PATENTS

| | | | |
|---|---|---|---|
| 2,927,870 | 3/1960 | Beutler | 260—429.3 X |
| 3,259,585 | 7/1966 | Fitch et al. | 252—313 |
| 3,282,857 | 11/1966 | Fitch et al. | 252—313 |

RICHARD D. LOVERING, *Primary Examiner.*

U.S. Cl. X.R.

167—85, 90; 252—309